INVENTOR.
PIER BAKKER
BY C. R. Sipe
ATTY.

April 26, 1960 P. BAKKER 2,934,608

DIGIT ABSORBING SELECTOR SWITCH

Filed Oct. 24, 1957 2 Sheets-Sheet 2

INVENTOR.
PIER BAKKER

BY C. R. Sipe

ATTY.

United States Patent Office 2,934,608

Patented Apr. 26, 1960

2,934,608

DIGIT ABSORBING SELECTOR SWITCH

Pier Bakker, Springfield, S. Dak., assignor to General Telephone Laboratories, Incorporated, Northlake, Ill., a corporation of Delaware Application October 24, 1957, Serial No. 692,121

12 Claims. (Cl. 179—18)

This invention relates in general to telephone systems, and more particularly to telephone systems utilizing digit absorbing selectors of which this invention is primarily concerned.

It is an object of the present invention to provide a numerical switch of the trunk hunting type utilizing vertical bank wiring and normal post springs wherein the level being stepped to by a wiper determines whether the digit will be absorbed, permit rotation of the wipers in search of an idle trunk in a particular level, or return busy tone to the calling party if an improper digit has been dialled.

It is another object of the present invention in a numerical switch of the above described type wherein only the operation of a cut-in relay permits searching for an idle trunk by rotation of the wipers on any level.

A feature of the present invention resides in the utilization of two sets of normal post springs which control busy blocking if the drop back digits are not dialled in the proper sequence before the operation of the cut-in relay.

Other objects and features will become apparent from a perusal of the following specification taken in conjunction with the drawings.

Figure 1:
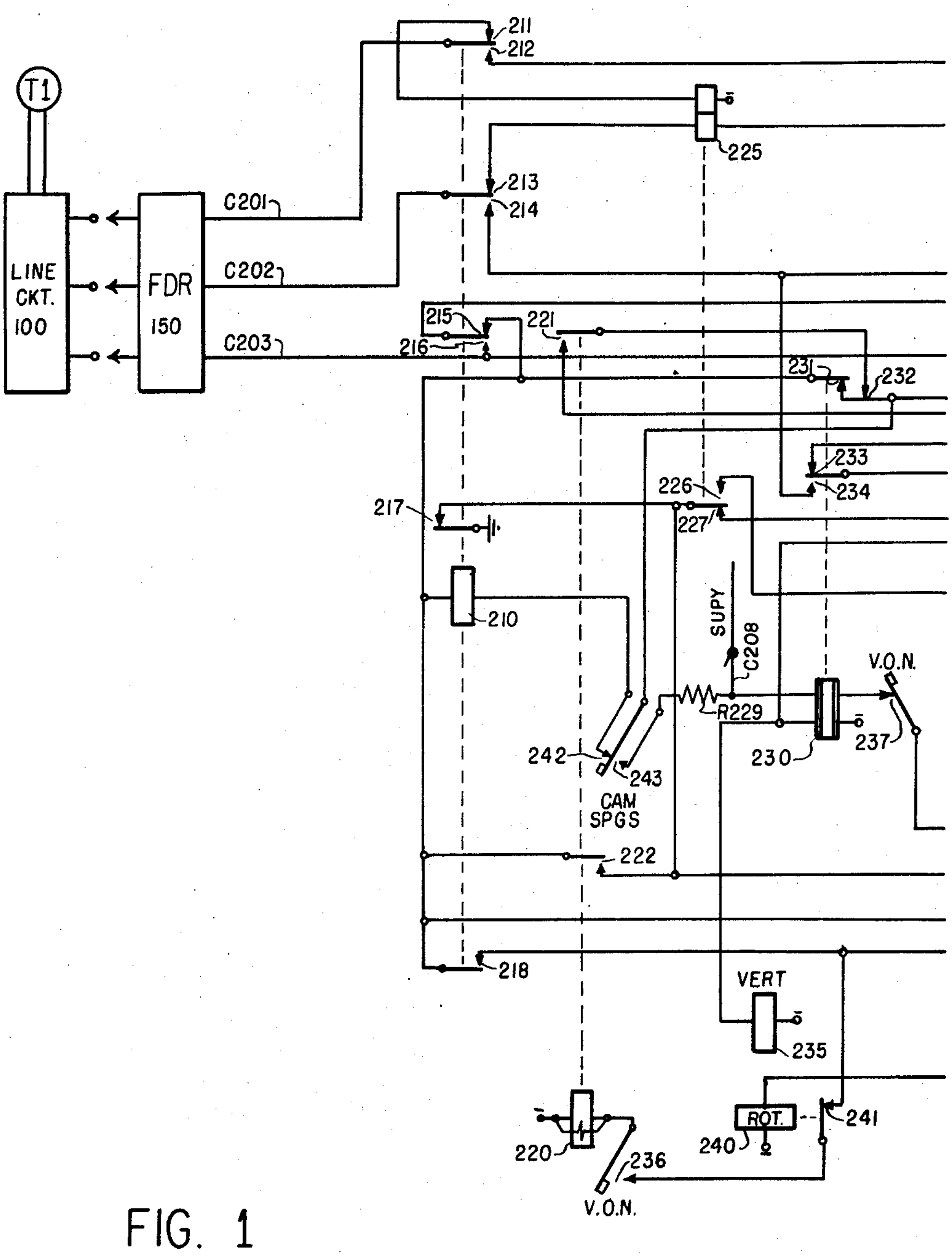
Figure 2:
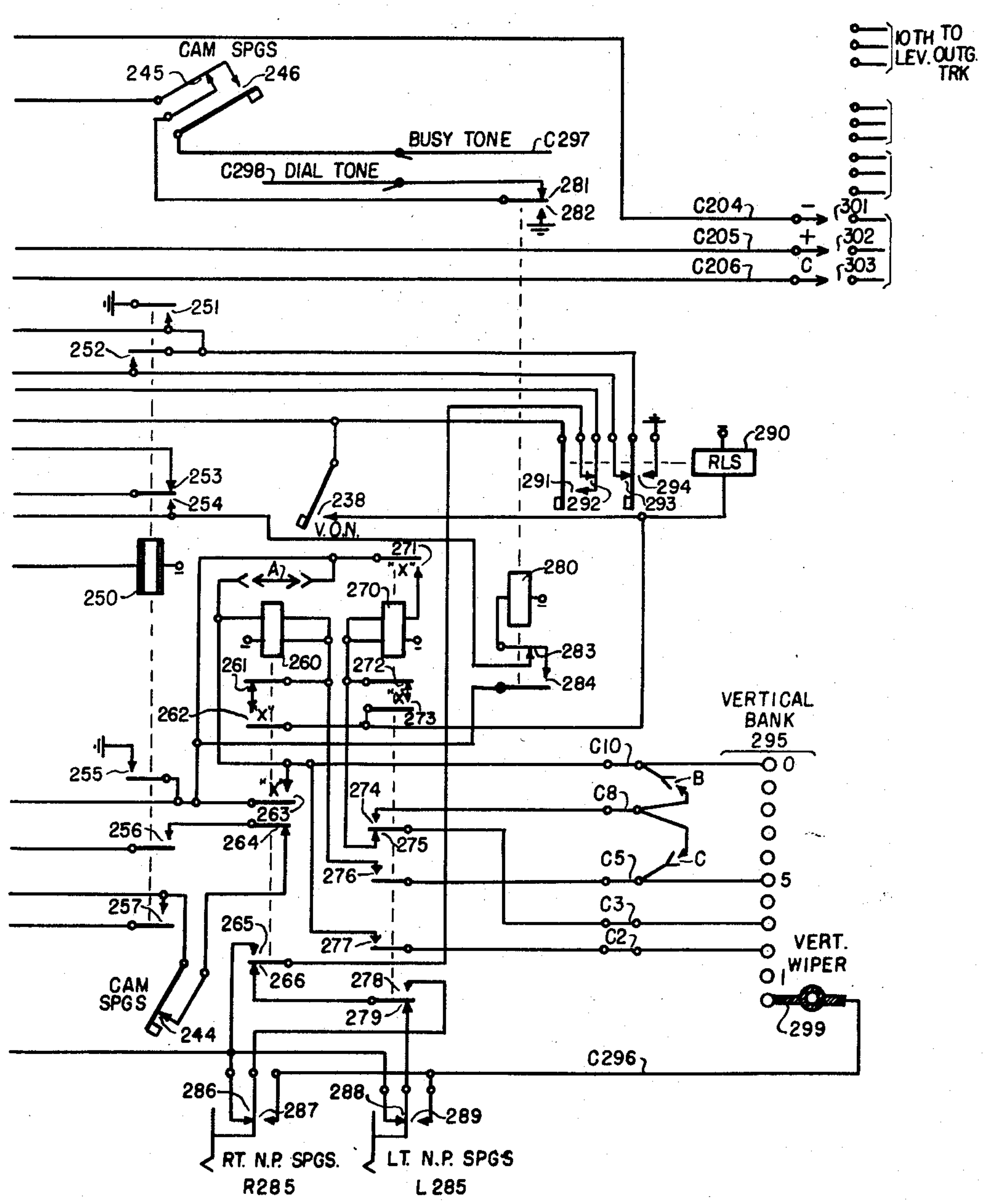

In the drawings, with Fig. 2 at the right of Fig. 1, there is shown a portion of a telephone exchange, namely line circuit 100, line finder 150, and selector 200. Also shown is a telephone substation T1 having the conventional telephone handset with a telephone dial (all not shown) for transmitting digital impulses. Line circuit 100 and line finder 150 are of the well-known Strowger type. Selector 200 is of the two motion trunk hunting type with additions therein comprising the invention of the present application.

In a telephone area or community there generally exists telephone exchanges of varying traffic loads, and naturally it is not practical nor profitable to have an extensive amount of equipment in the smaller exchanges when using seven digit call numbers. It is therefore necessary to utilize digit absorbing selectors to eliminate the excessive amount of equipment in these small exchanges as well as in the larger exchanges having direct access to these smaller exchanges. It has been the general practice in prior selectors to have code digits dialled in a sequential order for absorption to permit cutting into the succeeding switch. However, in prior such type selectors when the calling party dialled an incorrect series of digits the calling party was not aware of this fact, and may continue to dial without realizing that the equipment has not responded to his intended wishes. Under such circumstances, it frequently occurred that the switch cut-in on the third, fourth, fifth, or sixth dialled digit, when the cut-in should have been on the first or second digit. This arises when the correct first or second digit for permitting cut-in occurred on one of the following dialled digits leaving the calling party with the supposition that the correct directory numbers have been dialled when actually the call has only been extended as far as the first or second selector. It is therefore an object of the present invention to control a busy blocking if the drop back digit or digits are not dialled in proper sequence.

Selector 200 comprises seven relays and three magnets (vertical, rotary, and release). The selector also comprises the usual bank contact levels accessible to by wipers 301, 302 and 303, and also a vertical bank 295 accessible to by vertical wiper 299. A pair of normal post springs, namely right normal post springs R285 and left normal post springs L285, are controlled and operated independently depending upon the level stepped to by the wipers. Connected to the different bank contacts of vertical bank 295 are conductors for determining which relay (260 or 270) or the release magnet 290 will operate depending upon the level wiper 299 vertically steps to. Also, the level stepped to by wiper 299 determines whether the digit dialled will be absorbed, will cause cut-in, or will prepare for cut-in, or will initiate a busy block. Of the mentioned relays, only upon the full operation of cut-in relay 260 will cut-in to the succeeding switch be possible. As will become apparent from the detailed description to follow, a combination of different code digits or a single code digit must be dialled in a sequential order to operate relay 260 to permit cut-in. If an incorrect digit or sequence is inadvertently dialled, a busy tone will be returned to the calling party notifying him of the blocking situation. For a better understanding of the operations involved, a detailed explanation now follows.

*Single digit cut-in*

Assuming that substation T1 desires to make a toll call, the calling party will initially remove the handset. The closure of the line loop will operate a line circuit 100, which in turn, by means of an allotter (not shown), will cause a finder, such as 150, to search for and connect with the calling party in a manner well-known in the art. We will assume, that this finder 150 is linked with selector 200 via conductors C201, C202, and C203.

A loop circuit now extends from the telephone to pulsing relay 225; the circuit extending via the loop circuit the one hand, negative conductor C201, contacts 211, upper winding of relay 225 to battery; and on the other hand, positive conductor C202, contacts 213, lower winding of relay 225, cam spring contacts 245, contacts 281 to dial tone and ground via conductor 298. The operation of relay 225 closes contacts 226 to complete an obvious circuit to operate relay 250. At contacts 251 relay 250 places ground on C conductor C203 to hold the preceding equipment and mark selector 200 busy. At contacts 256, a shunt is placed on relay 210; at contacts 254 circuits are prepared to relay 280 and vertical magnet 235. At contacts 255 a circuit is closed to operate relay 230; the circuit extending from ground, contacts 255, VON contacts 237, upper winding of relay 230 to battery on the multipled supervisory conductor C208. Relay 230 operates and closes the control wiper 303 and conductor C206 to relay 210.

Upon the subscriber T1 dialling the digit "0" (designating a toll call) upon receipt of dial tone, relay 225 follows the dial pulses over the calling loop. Upon receipt of the first digital impulse of the series of ten, relay 225 restores opening contacts 226 and closing contacts 227 whereby the circuit to relay 250 is opened. However, relay 250 is slow-to-release and remains operated throughout the impulse series. A circuit is closed via ground, contacts 217, 227, 254, 283, winding of relay 280 to battery operating relay 280. A circuit is also closed to relay 230 and vertical magnet 235 in multiple to operate relay 230 and magnet 235. The operation of relay 280 at contacts 284 locks relay 280 operated via ground at contacts 255. At contacts 282 dial tone is replaced by ground to hold relay 225 operated at the end of the digital impulses.

At the end of the first dial pulse of the series, relay 225 reoperates and opens the multiple circuits to relay 230 and vertical magnet 235. The operation of vertical magnet 235 will step the wipers 299, 301, 302, and 303 one step vertically thereby operating the vertical off-normal spring contacts 236, 237 and 238. At VON contacts 236, a multiple circuit is closed to operate relay 220; the circuit extending from battery, winding of relay 220, contacts 236, 241, 257, 264, and 217 to ground and also via contacts 231, 252, 251 to ground. At VON contacts 237, the circuit to the upper winding of relay 230 is opened, however, relay 230 is slow-to-release and remains operated through its lower winding during the impulse series. At VON contacts 238, a circuit is prepared to release magnet 290. The operation of relay 220, at contacts 221 prepares a circuit to rotary magnet 240. At contacts 222, relay 220 completes a multiple holding path for itself via contacts 257, 222, 217 to ground. At the end of the first digital impulse of the series relay 225 reoperates. Each succeeding impulse of the series restores relay 225 to again close the circuit to the vertical magnet and relay 230 whereby this sequential operation continues until the wipers are stepped to the tenth level. At the end of the series of impulses relay 225 remains operated, and after a short delay relay 230 restores and the vertical magnet remains deenergized upon the opening of contacts 227.

Upon the wipers being stepped to the tenth bank level, the left normal post springs L285 operates and with the restoration of relay 230 completes a circuit to operate cut-in relay 260; the circuit extending from battery, lower and upper windings of relay 260, conductor C10, tenth bank contact of vertical bank 295, wiper 299, conductor C296, NPS contacts 279, 266, 292, 221, 232, 252, 251, to ground. Relay 260 operates its "X" contacts first whereby, at "X" contacts 263 a circuit including both windings of relay 260 and a locking circuit via contacts 255 is closed to relay 260 to fully operate and lock the relay; "X" contacts 262 being ineffective at this time. Thereafter, contacts 266 open the original contact circuit to relay 260, however relay 260 remains operated over the mentioned locking circuit. At contacts 264, a shunt circuit across relay 210 is removed. At contacts 265, a circuit to rotary magnet 240 is closed; the circuit extending from battery, winding of rotary magnet 240, contacts 265, 292, 221, 232, 252, 251, to ground. The operation of rotary magnet 240 steps the wipers 301, 302, and 303 to the first rotary bank contact and opens contacts 241 to restore relay 220. The restoration of relay 220 at contacts 221, opens the circuit to rotary magnet 240. Rotary magnet 240 restores and closes contacts 241 to reoperate relay 220 if ground is found on the contact engaged by wiper 303 designating a busy trunk. This last circuit extending via conductor C206, contacts 215, 257, 241, 236 through the winding of relay 220 to battery. When ground is encountered on the bank contact engaged by wiper 303 switching relay 210 is shunted over the following circuit to prevent its operation: ground, wiper 303, contacts 215, winding of relay 210, contacts 243, 252, and 251 to ground. This sequence continues until an idle outgoing trunk is found (by absence of ground) on control wiper 303.

When an idle trunk is found wiper 303 is not grounded and relay 210 is no longer shunted with the result that relay 210 now energizes in series with relay 220. The circuit for operating relay 210 may be traced from battery relay 220, contacts 236, 241, 257, winding of relay 210, contacts 242, 252, 251, to ground. Relay 210 operates, and at contacts 218 locks operated to battery through the winding of relay 220. Relay 220 restores through this circuit due to the high resistance in the winding of relay 210. At contacts 211 and 213, relay 210 opens the circuit to relay 225, which restores. At contacts 212 and 213, the loop circuit is extended to the seized outgoing trunk via conductors C204, wipers 301 and conductor C205, and wiper 302. At contacts 217, the circuit to relay 250 is opened and it restores after a short delay due to its slow-to-release characteristics. The restoration of relay 250 at contacts 255 opens the locking circuit to relays 260 and 280 to thus restore these relays. At contacts 253 a circuit is prepared to the release magnet 290. Ground is fed back from the succeeding switch in a well-known manner over wiper 303 and contacts 216 to hold the switch train before contacts 251 open.

The remainder of the call will thus be handled in a conventional manner via the outgoing trunk and a toll operator.

*Second digit cut-in*

Selector 200, as shown in the drawings, is arranged to cut-in on the second dialled digit 2 in case the first drop-back digit 3 is dialled.

Assuming the subscriber T1 seizes selector 200 in the manner described and dials the digit "3" first. This digit will be absorbed in a manner to be described.

Relays 225, 230, and 250 operate on seizure as described. Upon receipt of the three digital impulses, relay 220 will operate and the vertical magnet 235 will step the wipers 299, 301, 302 and 303 to their respective third bank levels in a manner previously described. At the third level of bank contacts, the left normal post springs L285 will operate and prepare a circuit to relay 270.

At the end of the series of digital impulses relay 230 restores in a manner disclosed. A circuit is now closed to partially operate relay 270; the circuit extending from battery, lower winding of relay 270, contacts 275, conductor C3, third contact of vertical bank 295, wiper 299, conductor C296, contacts 289, 279, 266, 292, 221, 232, 252, 251, to ground. The operation of relay 270 operates its "X" contacts only because at "X" contacts 271 the upper winding of relay 270 is shorted from ground via contacts 255. At "X" contacts 273 a circuit to the release magnet 290 is closed and a second short is prepared to relay 270; the circuit to release magnet 290 extending from battery, winding of release magnet 290, contacts 273, 272, 275, conductor C3, third bank contact of vertical bank 295, wiper 299, conductor C296, contacts 289, 279, 266, 292, 221, 232, 252, 251, to ground. The release magnet 290 at contacts 294 closes a multiple ground to the C conductor C203. At contacts 291 magnet 290 locks itself operated; the circuit extending from battery, winding of magnet 290, VON contacts 238, contacts 291, 221, 232, 252, to ground at contacts 251 and 294. Also at contacts 291, an alternate circuit replacing the operating circuit to relay 270 is closed when the wipers restore; the circuit extending from battery, winding of relay 270, contacts 272, 273, 238, 291, 221, 232, 252, and 251 to ground. The release magnet 290 releases the switch shaft to restore the wipers to normal to thus restore the VON springs. VON contacts 238 open to restore the release magnet and opens the short from the upper winding of relay 270 to fully operate relay 270 over both its windings via contacts 271 and 255. VON contacts 236 open to restore relay 220. At VON contacts 237 the original operating circuit to relay 230 is closed, reoperating relay 230. The full operation of relay 270 at contacts 272 further opens the short to the upper winding of relay 270. At contacts 276 and 277 circuits are prepared for bank contacts 5 and 2 respectively of vertical bank 295. At contacts 278 a circuit is prepared from the right normal post spring R285 and wiper 299.

For a second digit cut-in, the second digit dialled must be the digit "2." It will first be pointed out that the following relays are operated prior to dialling this second digit; relays 225, 230, 250, and 270. Upon dialling the digit "2" the vertical magnet 235 steps the wipers to their respective second vertical bank levels. Upon the wipers taking their first vertical step the VON springs operate. At VON contacts 236 the circuit to relay 220 is reclosed to operate this relay. At the end of the digital impulse series relay 230 restores and at contacts 231 opens one of the multiple circuits to relay 220. Upon wiper 299 being stepped to the second bank contact of vertical bank 295, the right normal post springs R285 operate to complete a circuit to relay 260; the circuit extending from battery, lower and upper windings of relay 260, contacts 277, conductor C2, second bank contact of vertical bank 295, wiper 299, conductor C296, NPS contacts 287, contacts 278, 266, 292, 221, 232, 252, 251, to ground. At "X" contacts 263 relay 260 locks operated via contacts 255 and ground. At contacts 264, a second circuit to relay 220 is opened however, relay 220 remains operated over its locking circuit. Also contacts 264 open one of the shunts across relay 210 while the remaining shunt including contacts 222 is removed when relay 220 is restored by the operation of magnet 240. At contacts 265, a circuit to the rotary magnet 240 is closed; the circuit extending from battery, winding of magnet 240, contacts 265, 292, 221, 232, 252, 251, to ground. Rotary magnet 240 and relay 220 will alternately operate in a manner previously disclosed until an idle trunk circuit is found wherein relay 210 will operate when it is no longer shorted over wiper 303 to switch the call through.

An alternate wiring modification is shown for the vertical banks by strap B so that if the first and second digits are the same digits, such as the digit "3" to provide a cut-in on the second dialled digit, strap B is strapped across conductors C8 and C10. The operation would be the same as above described except that the switch wiper 299 is twice stepped to the third bank contact connected to conductor C3. The first digit "3" dialled would be absorbed in the manner previously described and the second digit "3" would give cut-in. As will be recalled relay 270 operates fully after drop-back upon dialling the first digit "3." This would close contacts 274, whereby upon dialling the second digit "3" a circuit would be closed to operate relay 260 to permit cut-in. The last circuit extending from battery, lower and upper windings of relay 260, conductor C10, strap B, conductor C8, contacts 274, conductor C3, wiper 299, conductor C296, NPS contacts 289, contacts 279, 266, 292, 221, 232, 252, 251, to ground. In this modification and when relay 260 is operated after dialling the second digit 3, the switch hunts in the third level in search of an idle trunk in a manner similar to that previously described.

The remaining digits will thus be dialled directly into the next seized succeeding switches in a conventional manner.

*Third digit cut-in*

Selector 200 as shown in the drawings, is arranged to cut-in on a plurality of third dialled digits, provided the first drop-back digit 3 and the second drop back digit 5 has been dialled.

Assuming it is desired to permit the third digit dialled to cut-in, the following digits must be sequentially dialled—"3," "5," prior to dialling the third digit.

Upon the calling subscriber T1 dialling the first digit "3," the wipers will be stepped to the third level and the digit absorbed as previously described, whereby relays 225, 230, 250, 270, and 280 will be operated after the release of the wipers.

Upon the calling subscriber T1 dialling the second digit "5," the wipers 299, 301, 302, and 303 will step to their respective fifth levels. At the fifth bank contact on vertical bank 295, the right normal post springs R285 operate and prepare a circuit to relay 260. Relay 230 restores after the series of digital impulses and at contacts 233 closes the circuit to relay 260; the circuit extending from battery, lower winding of relay 260, contacts 276, conductor C5, fifth contact of vertical bank 295, wiper 299, conductor C296, NP spring contacts 287, contacts 278, 266, 292, 221, 232, 252, and 251 to ground. The "X" contacts close first; at "X" contacts 262 and 263 the upper winding of relay 260 is shorted to prevent the complete operation of this relay. At "X" contacts 262, a circuit to release magnet 290 is closed and an alternate circuit to relay 260 is prepared; the circuit to release magnet 290 extending from battery, winding of magnet 290, contacts 262, 261, 276, conductor C5, to the ground on wiper 299. The release magnet 290, operates locks, transfers ground on the control conductor and releases the switch shaft in a manner previously described. When the release magnet 290 operated, at contacts 291 an alternate shunting circuit to relay 260 is closed to prevent operation of relay 260 when the operating circuit is opened during restoration of the wipers; the circuit extending from ground contacts 255 and 263 upper winding of relay 260, contacts 261, 262, 238, 291, 221, 232, 252, 251, to ground. The VON springs restore whereby; at VON contacts 238 the locking circuit to release magnet 290 is opened to restore this magnet and also removes the short across the upper winding of relay 260; at VON contacts 237 the circuit to relay 230 is closed, reoperating this relay; at VON contacts 236 the circuit is opened to restore relay 220. The reoperation of relay 230 at contacts 231 recloses the C wiper 303 to control conductor C203. The removal of the short across the upper winding of relay 260 operates relay 260 fully through both windings by way of contacts 255 and 263 whereby at contact 261 the short is further opened; at contacts 265 a circuit to rotary magnet 240 is prepared.

Since relay 260 has fully operated, the next digit dialled will cut-in on the level corresponding to the numerical value of the dialled digit, regardless of whether the left normal post springs L285 on the right normal post springs R285 operate. The circuit to rotary magnet 240 will by-pass these normal post springs via contacts 265 of relay 260 and when relay 220 operates, upon the receipt of the next series of digital impulses. It thus becomes obvious that the only time that a cut-in is permitted on any level is after relay 260 operates fully.

In another modification and when the first and second digits are the same and are both to be absorbed, such as the digit "3," strap C is strapped across conductors C5 and C8 on vertical bank 295. The operation will be the same as that described for digits 3 and 5 except that the vertical wiper 299 is twice stepped to the third bank position which is wired to conductor C3.

The rotary stepping and switch-through is identical with that previously described.

*All trunks busy*

If all the trunks are busy during rotation of the wipers 301, 302, and 303, automatic stepping continues until the cam springs operate on the eleventh rotary position. The relays operated during the rotation of the wipers as previously disclosed are relays 220, 225, 250, 260 and possibly 270. The operation of the cam springs at contact 245 removes ground from the positive conductor C202 and at contact 246 replaces it with busy tone for transmission to the calling subscriber at substation T1. At cam contacts 242 the prepared circuit to relay 210 is opened. At cam contacts 243 the supervisory lead C208 is closed through register R229, contacts 251, to ground for notification of the existing busy condition. At cam contacts 244 the circuit to relay 220 is further opened, and the absence of ground on the C wiper 303 on the eleventh rotary position restores relay 220 completely. The complete restoration of relay 220 opens contacts 221 to open the circuit to rotary magnet 240.

*Release from an all trunks busy condition*

Upon receipt of the busy tone, the calling subscriber at substation T1 disconnects the call by hanging up the handset to open the loop circuit. Relay 225 will then release, opening contacts 226 to restore slow-to-release relay 250 after a short delay. Relay 250 restores whereby at contacts 253, a circuit is closed to release magnet 290; the circuit extending from battery, winding of release magnet 290, VON contacts 238, contacts 233, 253, 227 and 217 to ground. At contacts 254 the originial operating circuit to relay 280 is opened. At contacts 255 the locking circuits to relays 260, 280, and 270 (if operated) are opened to restore these relays. At contacts 256 and 257 the prepared circuits to relay 220 are further opened. At contacts 251 ground is removed from C conductor C203 to release the preceding equipment. The release magnet 290 operates and returns the wipers 299, 301, 302 and 303 to normal, to thus restore the cam springs and VON springs to normal. The opening of VON contacts 238 restores release magnet 290 and selector 200 is now again available for seizure.

*Release after switch through*

Upon the calling party at substation T1 and the called party (not shown) terminating the call by replacing their handsets, the following sequence occurs: the removal of ground from the control wiper 303 restores relay 210 and the preceding switches. At contacts 216 the control wiper 303 is disconnected from the C conductor C203 leading to the preceding equipment. At contacts 217 a circuit is closed to release magnet 290; the circuit extending from battery, winding of magnet 290, VON contacts 238, contacts 233, 253, 227 and 217 to ground. The release magnet restores the wipers to normal to thereby restore the VON springs. The opening of VON contacts 238 restores release magnet 290 to thus make selector 200 available for seizure.

*Prevention of an incorrect dialling sequence before cut-in established*

Selector 200, as shown in the drawings, is wired so that the dialling of a first incorrect digit will cause vertical and rotary operation of the switch to its eleventh rotary position where a busy tone is transmitted back to the calling party. More specifically these incorrect first digits are 1, 2, 4, 5, 6, 7, 8 and 9. If the first correct digit "0" is dialled the switch trunk hunts for an idle trunk and if the first correct drop-back digit "3" is dialled the switch is restored after the vertical operation as previously described.

After the first drop-back digit "3" is dialled and the switch is restored, the following second digits such as 1, 3, 4, 6, 7, 8, 9, and 10 cause vertical and rotary operation of the switch to give the calling subscriber a busy tone to thereby block further dialling. If the second dialled digit is "2" the switch trunk hunts for an idle trunk to extend the connection and if the second dialled digit is "5" the switch restores after the second vertical operation.

After the second drop-back the selector may be operated to any level and will hunt in the selected level for an idle trunk.

Assuming the calling party at substation T1 inadvertently dials a wrong digital sequence before operating relay 260 the calling party will receive busy tone. For instance, should the calling party inadvertently dial a first digit "5" upon receiving dial tone, relay 225 will intermittently restore and pulse vertical magnet 235 to step the wipers to their respective fifth levels. Upon the wipers taking the first step, VON contacts 236 close and complete a circuit to operate relay 220 as previously described. At the end of the impulse series relay 230 restores and vertical wiper 299 will engage the fifth contact on vertical bank 295. Conductor C5 is open however and wiper 299 rests on an open circuit. Since neither relay 260 or 270 are operated or partially operated there is no prepared circuit to the release magnet, however at normally closed contacts 264 a shunt exists across the winding of relay 210. The shunted winding of relay 210 can be traced from ground, contacts 251, 252, cam contacts 242, thru winding of relay 210 and; ground contacts 217, 256, 264, cam contacts 244, thru winding of relay 210. Also it will be recalled that on the fifth level the right normal post spring R285 operate to close contacts 287, but are ineffective at this time since contacts 278 are not closed.

The operation of relay 220 at contacts 221 closes a circuit to rotary magnet 240; the circuit extending from battery, winding of magnet 240, NPS contacts 288, contacts 279, 266, 292, 221, 232, 252, and 251 to ground. Rotary magnet 240 operates, opening contacts 241 to relay 220. Relay 220 restores and opens contacts 221 and the circuit to rotary magnet 240. This sequence of operations between relay 220 and rotary magnet 240 continues to rotate the wipers over the fifth level of bank contacts. Since relay 210 is shunted by way of contacts 264 and even should an idle trunk be available relay 210 will not operate. Thus, the wipers will be rotated to the eleventh rotary position to operate the cam springs and return busy tone in a manner previously described.

From the foregoing it will be seen that whenever the vertical wiper 299 encounters an open circuit condition while the shunt around relay 210 is closed at contacts 264, the switch is rotated to its eleventh position to transmit the busy tone to the calling subscriber thereby blocking further extension of the call.

In the event of a second wrong digit inadvertently dialled, busy tone would also be returned to the calling party. For instance, assuming relay 270 is fully operated after dialling the first digit "3" as previously described, and the calling party inadvertently dials the digit "6" as the second digit. Upon the vertical wiper 299 stepping to the sixth level, neither normal post springs set will operate. Since level six on vertical bank 295 is open, relay 260 is not operated. However, a circuit to rotary magnet 240 is closed when relay 230 restores after the vertical operation; the circuit extending from battery, winding of rotary magnet 240, NPS contacts 286, contacts 278, 266, 292, 221, 232, 251, to ground. The wipers will thus be rotated over the sixth level but since relay 210 is shunted, the wipers will rotate to the overflow position and return busy tone in a manner previously described.

From the foregoing it will be seen that whenever an incorrect second digit, such as 1, 3, 4, 6, 7, 8, or 0, is dialled the relay 260 does not operate. On levels 1, 4, 6, 7, 8, and 9 no circuit is available over wiper 299 to operate relay 260. On level "3," since relay 270 is operated and, assuming straps B and C are cut, no circuit is available to operate relay 260. On level "0" contacts 279 of relay 270 are open with the result that no circuit is provided for relay 260. Since relay 260 does not operate, the shunt at contacts 264 for relay 210 causes the switch to rotate to its eleventh position to transmit busy tone to calling subscriber and block further extension of the call.

Upon the receipt of the busy tone, the calling party would hang up the receiver and release the equipment in a manner previously described. The calling party could then attempt to make the call correctly at another time.

*Single digit cut-in only*

For easy conversion of selector 200 to a second, third etc. selector in a switch train or for that matter a first selector, where it is desirable to cut-in only on the single digit dialled herein, strap A would be inserted. Under this condition, immediately upon seizure of selector 200 the operation of relay 250 at contacts 255 would close a circuit through strap A and the windings or relay 260. Relay 260 would thus open contacts 264 to remove the shunt across the winding of relay 210 and permit operation of relay 210 when an idle trunk is found during rotation.

While there has been described what is at present considered to be the preferred embodiment of the invention, it will be understood that various modifications may be made therein, and it is intended to cover in the appended claims all such modifications as fall within the true spirit and scope of the invention.

Having described my invention in detail, what I claim, and desire to have protected by issuance of Letters Patent of the United States is set forth in the appended claims.

What is claimed is:

1. In a telephone system, a two-motion step-by-step selector comprising a set of wipers, a terminal bank terminating trunks and divided into levels, a vertical wiper and a vertical bank divided into levels, means for commonly advancing said wiper set and said vertical wiper to select any level, said means controlled by digital impulses incoming to said selector, and rotary means for advancing said set of wipers in any level to select an idle outgoing trunk, a plurality of relays including a cut-in and a switch-through relay, a first and a second set of normal post springs, said first set of normal post springs operated on any of a first plurality of levels stepped to by said wipers and said second set of normal post springs operated on any of a second plurality of levels stepped to by said wipers, means including one of said normal post spring sets for absorbing a first dialled digit responsive to said vertical wiper being stepped to a first predetermined level, means for absorbing a second dialled digit responsive to said vertical wiper being stepped to a second predetermined level, circuit means prepared for operating said cut-in relay to permit cutting in on any level responsive only to digital impulses received in a predetermined sequential order, means responsive only to the operation of said cut-in relay to permit operation of said switch-through relay for extending a call to an idle seized outgoing trunk, means for imposing a busy block condition upon receipt of digital impulse series other than in said predetermined sequential order regardless of which normal post spring set operates.

2. In a telephone system, a two-motion step-by-step selector comprising a set of wipers, a terminal bank terminating trunks and divided into levels, a vertical wiper and a vertical bank having plural levels, means for commonly advancing said wiper set and said vertical wiper to select any level, said means controlled by digital impulses incoming to said selector, and means for advancing said set of wipers in any level to select an idle outgoing trunk, a plurality of relays including a cut-in relay and a switch-through relay, means responsive only to the complete operation of said cut-in relay for permitting the operation of said switch-through relay for extending a call to an idle trunk, a pair of normal post spring sets with one or the other set operated depending upon certain levels stepped to by the wipers, said cut-in relay operated only upon a predetermined or sequential order of digits for operating one of said normal post spring sets and stepping said vertical wiper to a level for completing the circuit thereto, and means responsive to a digital impulse series or second sequential order of digital impulses other than said predetermined or said first sequential order of digits for returning a busy blocking to the calling party regardless of which normal post spring set is operated or whether an idle trunk is available during advancement of said wiper sets on the level stepped to.

3. In a telephone system, a two-motion step-by-step selector comprising a set of wipers, a terminal bank terminating trunks and divided into levels, a vertical wiper and vertical bank having plural levels, means for commonly advancing said wiper set and said vertical wiper to select any level, said means controlled by digital impulses incoming to said selector, and rotary means for advancing said set of wipers in any level to select an idle outgoing trunk, a plurality of relays including a cut-in and a switch-through relay, means controlled by the normal unoperated condition of said cut-in relay for imposing a shunt across said switch-through relay, a pair of sets of normal post springs with one or the other set operated depending upon the certain levels stepped to by said wipers, circuit means controlled by said vertical wiper and one of said sets of normal post springs for operating said cut-in relay responsive to the receipt of a predetermined sequential digital impulse series, contact means operating responsive to the operation of said cut-in relay for removing said shunt to permit operation of said switch-through relay during rotation of said wipers to seize an idle outgoing trunk, and circuit means controlled for rotating said wipers to an overflow position to initiate a busy blocking responsive to a sequential digital impulse series other than said predetermined sequential digital impulse series regardless of an idle outgoing trunk being available on said terminal bank level stepped to by said wipers, and regardless of which normal post spring set has operated.

4. In a telephone system, a two-motion step-by-step selector comprising a set of wipers, a terminal bank terminating trunks and divided into levels, a vertical wiper and a vertical terminal bank divided into levels, means for commonly advancing said wiper sets and said vertical wiper to select any level, said means controlled by digital impulses incoming to said selector, and rotary means for advancing said set of wipers in any level to select an idle outgoing trunk, a plurality of relays including a cut-in relay and a switch-through relay, means controlled by the normal unoperated condition of said cut-in relay for imposing a shunt across said switch-through relay, a pair of sets of normal post springs, one of said sets of normal post springs operated responsive to said wipers being stepped to a first plurality of bank levels and said other set of normal post springs operated responsive to said wipers being stepped to a second plurality of bank levels, circuit means controlled by said vertical wiper and said first set of normal post springs for absorbing a first dialled digit responsive to the receipt of a first predetermined series of digital impulses, a second circuit means controlled by said vertical wiper and said second set of normal post springs for operating said cut-in relay responsive to the receipt of a predetermined second series of digital impulses, contact means operating responsive to the operation of said cut-in relay for removing said shunt to permit the operation of said switch-through relay upon said wipers finding an idle trunk during rotation thereof, and a third circuit means completed independent of said vertical wiper and said normal post springs for initiating a busy block responsive to the receipt of a second digital impulse series other than said predetermined second digital impulse series.

5. In a telephone system, a two-motion step-by-step selector comprising a set of wipers, a terminal bank terminating trunks and divided into levels, a vertical wiper and a vertical terminal bank divided into levels, means for commonly advancing said wiper sets and said vertical wiper to select any level, said means controlled by digital impulses incoming to said selector, and rotary means for advancing said set of wipers in any level to select an idle outgoing trunk, a plurality of relays including a cut-in relay and a switch-through relay, means controlled by the normal unoperated condition of said cut-in relay for imposing a shunt across said switch-through relay, a pair of sets of normal post springs, one of said sets of normal post springs operated responsive to said wipers being stepped to a first plurality of bank levels and said other set of normal post springs operated responsive to said wipers being stepped to a second plurality of bank levels, circuit means controlled by said vertical wiper and said first set of normal post springs for absorbing a first dialled digit responsive to the receipt of a first predetermined series of digital impulses, a second circuit means controlled by said vertical wiper and said other normal post springs for partially operating said cut-in relay responsive to the receipt of a predetermined second series of digital impulses, contact means operated responsive to the partial operation of said cut-in relay for restoring said wipers to normal and absorb said second dialled digit, and circuit means responsive to the restoration of said wipers to completely operate said cut-in relay, contact means operated to remove said shunt across said switch-through relay responsive to the complete operation of said cut-in relay to permit operation thereof upon seizing an idle trunk subsequent to the receipt of any third series of digital impulses.

6. In a telephone system, a two-motion step-by-step selector comprising a set of wipers, a terminal bank terminating trunks and divided into levels, a vertical wiper and a vertical bank divided into levels, means for commonly advancing said wiper set and said vertical wiper to select any level, said means controlled by digital impulses incoming to said selector, and rotary means for advancing said set of wipers in any level to select an idle outgoing trunk, a plurality of relays, a first relay normally shunting a second relay, a pair of normal post spring sets, the first set of said normal post springs operated on a first plurality of levels stepped to by said wipers, the second set of said normal post springs operated on a second plurality of levels stepped to by said wipers, a third relay partially operated responsive to said vertical wiper being stepped to a predetermined level and operating said first set of normal post springs responsive to the receipt of a first predetermined digital impulse series, means operated responsive to the partial operation of said third relay for restoring said wipers to normal and absorbing the dialled digit, means responsive to the restoration of said wipers for completely operating said third relay to in turn prepare said first relay for operation, said first relay partially operated responsive to said vertical wiper being stepped to a second predetermined level and operating said second set of normal post springs responsive to the receipt of a second predetermined digital impulse series, said third means operated responsive to the partial operation of said first relay for restoring said wipers to normal and absorbing the second dialled digit, means responsive to the restoration of said wipers for completely operating said first relay, contact means operated responsive to the operation of said first relay for removing said shunt from said second relay to permit operation of said second relay responsive to the receipt of a third series of digital impulses to extend a call to an outgoing trunk, said shunting means preventing the operation of said second relay in the event said first relay does not operate responsive to said vertical wiper being stepped to an open level upon receipt of an incorrect second digital impulse series, wherein a busy blocking will be transmitted regardless of whether or not an idle trunk exists on said terminal bank level stepped to by said set of wipers.

7. In a telephone system, a two-motion selector comprising a set of wipers, a bank terminating trunks and divided into levels, a vertical wiper and a vertical contact individual to each level, primary means responsive to dialled digits for operating said wiper set and said vertical wiper in a primary direction to select a level corresponding to the received dialled digit, secondary means for advancing said wiper set in a secondary direction in any selected level to hunt for and select an idle trunk, first normal post springs operable in response to the primary operation of said set of wipers to predetermined levels, second normal post springs operable in response to the primary operation of said set of wipers to other predetermined levels, testing means for enabling said set of wipers to connect with an idle trunk in a selected level to terminate the secondary hunting operation of said wiper set, disabling means for disabling said testing in response to the seizure of said selector; a first circuit including said first normal post springs, said vertical wiper and one of said vertical contacts for operating said disabling means to enable said testing means to connect said wiper set to an idle trunk in response to only a first dialled digit of a predetermined numerical value and a first primary movement; a second circuit including said second normal post springs, said vertical wiper and a second of said vertical contacts for operating said disabling means to enable said testing means to connect said wiper set to an idle trunk in response to only a second dialled digit of a different predetermined numerical value and a second primary movement; and a third circuit including said second normal post springs, said vertical wiper and a third of said vertical contacts effective after receipt of only a second dialled digit of a further predetermined numerical value and a second primary movement for operating said disabling means to enable said testing means to connect said wiper set to an idle trunk in response to the receipt of any dialled third digit and a third primary movement.

8. In a telephone system as claimed in claim 7 including means for releasing said set of wipers and said vertical wiper from its primary movement to normal, and said third circuit also effective after receipt of said second dialled predetermined digit and after said second secondary movement for operating said releasing means to restore said set of wipers and said vertical wiper to normal to prepare for said third primary movement.

9. In a telephone system as claimed in claim 8, a fourth circuit including said first normal post springs, said vertical wiper and a fourth of said vertical contacts for operating said releasing means to restore said set of wipers and said vertical wipers from its first primary movement to normal in response to the receipt of only a first dialled drop-back digit of a still different numerical value.

10. In a telephone system, a two-motion selector comprising a set of wipers, a bank terminating trunks and divided into levels, a vertical wiper and a vertical contact individual to each level, primary means responsive to dialled digits for operating said wiper set and said vertical wiper in a primary direction to select a level corresponding to the received dialled digit, secondary means for advancing said wiper set in a secondary direction in any selected level to hunt for and select an idle trunk, first normal post springs operable in response to primary operation of said set of wipers to predetermined levels, second normal post springs operable in response to the primary operation of said set of wipers to other predetermined levels, testing means for enabling said set of wipers to connect with an idle trunk in a selected level to terminate the secondary hunting operation of said wiper set, disabling means for disabling said testing means in response to the seizure of said selector; a first circuit including said first normal post springs, said vertical and one of said vertical contacts for operating said disabling means to enable said testing means to connect said wiper set to an idle trunk in response to only a first dialled digit of a predetermined numerical value and a first primary movement; a second circuit including said second normal post springs, said vertical wiper and a second of said vertical contacts for operating said disabling means to enable said testing means to connect said wiper set to an idle trunk in response to only a second dialled digit of a different predetermined numerical value and a second primary movement; a third circuit including said second normal post springs, said vertical wiper and a third of said vertical contacts effective after receipt of only a second dialled digit of a further predetermined numerical value and a second primary movement for operating said disabling means to enable said testing means to connect said wiper set to an idle trunk in response to the receipt of any dialled third digit and a third primary movement, means for releasing said set of wipers and said vertical wiper from its primary movement to normal, a fourth circuit including said first normal post springs, said vertical wiper and a fourth of said vertical contacts for operating said releasing means to restore said set of wipers and said vertical wiper from its first primary movement to normal in response to the receipt of only a first dialled drop-back digit of a still different numerical value.

11. In a telephone system, a two-motion selector comprising a set of wipers, a bank terminating trunks and divided into levels, a vertical wiper and a vertical contact individual to each level, primary means responsive to dialled digits for operating said wiper set and said vertical wiper in a primary direction to select a level corresponding to the received dialled digit, secondary means for advancing said wiper set in a secondary direction in any selected level to hunt for and select an idle trunk, first normal post springs operable in response to the primary operation of said set of wipers to predetermined levels, second normal post springs operable in response to the primary operation of said set of wipers to other predetermined levels, testing means for enabling said set of wipers to connect with an idle trunk in a selected level to terminate the secondary hunting operation of said wiper set, disabling means for disabling said testing means in response to the seizure of said selector; a first circuit including said first normal post springs, said vertical wiper and one of said vertical contacts for operating said disabling means to enable said testing means to connect said wiper set to an idle trunk in response to only a first dialled digit of a predetermined numerical value and a first primary movement; a second circuit including said second normal post springs, said vertical wiper and a second of said vertical contacts for operating said disabling means to enable said testing means to connect said wiper set to an idle trunk in response to only a second dialled digit of a different predetermined numerical value and a second primary movement; a third circuit including said second normal post springs, said vertical wiper and a third of said vertical contacts effective after receipt of only a second dialled digit of a further predetermined numerical value and a second primary movement for operating said disabling means to enable said testing means to connect said wiper set to an idle trunk in response to the receipt of any dialled third digit and a third primary movement; and means effective in case said vertical wiper finds an open circuit condition, after either a first or a second primary movement in response to the receipt of other digits having numerical values different from said previously mentioned first and second dialled digits, for maintaining said disabling means to block further operation of said selector and to transmit a busy tone to a calling subscriber.

12. In a telephone system, a two-motion selector comprising a set of wipers, a bank terminating trunks and divided into levels, a vertical wiper and a vertical contact individual to each level, primary means responsive to dialled digits for operating said wiper set and said vertical wiper in a primary direction to select a level corresponding to the received dialled digit, secondary means for advancing said wiper set in a secondary direction in any selected level to hunt for and select an idle trunk, first normal post springs operable in response to the primary operation of said set of wipers to predetermined levels, second normal post springs operable in response to the primary operation of said set of wipers to other predetermined levels, testing means for enabling said set of wipers to connect with an idle trunk in a selected level to terminate the secondary hunting operation of said wiper set, disabling means for disabling said testing means in response to the seizure of said selector; a first circuit including said first normal post springs, said vertical wiper and one of said vertical contacts for operating said disabling means to enable said testing means to connect said wiper set to an idle trunk in response to only a first dialled digit of a predetermined numerical value and a first primary movement; a second circuit including said second normal post springs, said vertical wiper and a second of said vertical contacts for operating said disabling means to enable said testing means to connect said wiper set to an idle trunk in response to only a second dialled digit of a different predetermined numerical value and a second primary movement; a third circuit including said second normal post springs, said vertical wiper and a third of said vertical contacts effective after receipt of only a second dialled digit of a further predetermined numerical value and a second primary movement for operating said disabling means to enable said testing means to connect said wiper set to an idle trunk in response to the receipt of any dialled third digit and a third primary movement, an overflow position in said selector; means controlled by the unoperated condition of said disabling means, in case said vertical wiper fails to connect with one of said circuits for controlling the operation of said disabling means in either said first or said second primary movement, for enabling said secondary operating means to advance said wiper set in a secondary movement beyond said trunks to said overflow position to block further extension of the call beyond said selector; and means in said overflow position for transmitting busy tone back over the incoming path to a calling subscriber.

References Cited in the file of this patent

UNITED STATES PATENTS

| | | |
|---|---|---|
| 2,642,498 | Riddell et al. | June 16, 1953 |
| 2,748,194 | Gatzert | May 29, 1956 |
| 2,836,659 | Pharis | May 27, 1958 |